Aug. 30, 1932.          E. A. SPERRY ET AL          1,874,067
FLAW DETECTOR FOR IRREGULAR OBJECTS
Filed Aug. 17, 1929
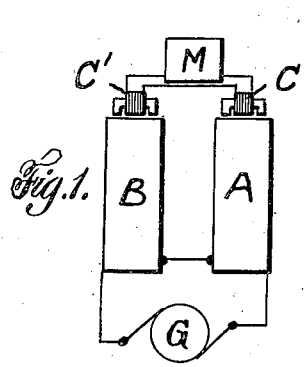
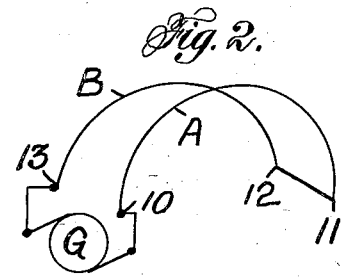
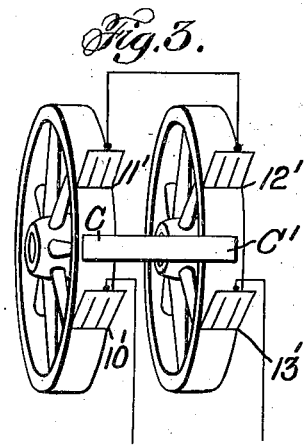
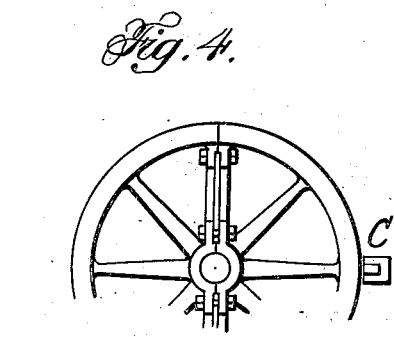
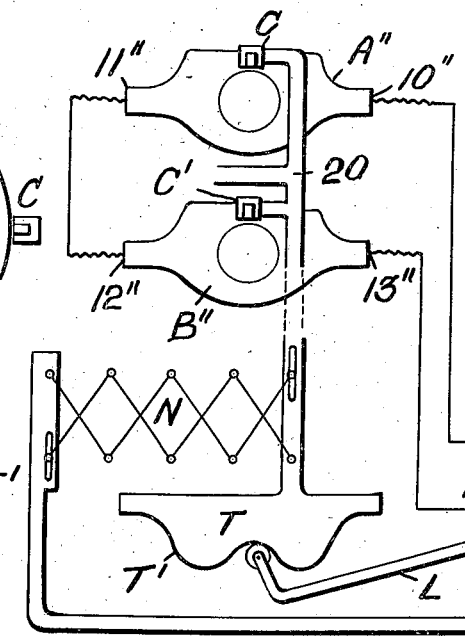
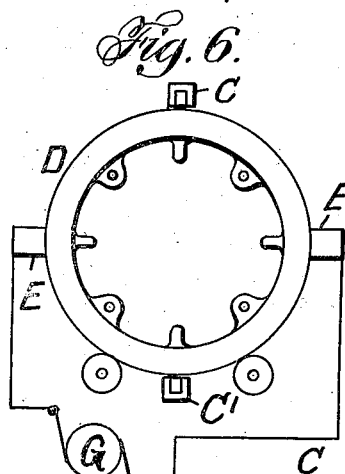
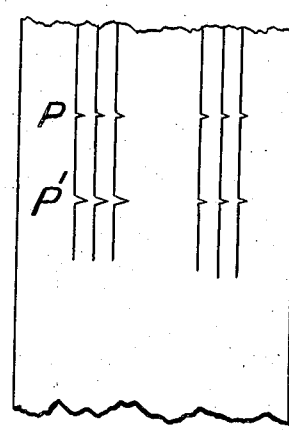
INVENTORS.
ELMER A SPERRY &
HARCOURT O. DRAKE
BY
ATTORNEY.

Patented Aug. 30, 1932

1,874,067

UNITED STATES PATENT OFFICE

ELMER A. SPERRY, OF BROOKLYN, AND HARCOURT C. DRAKE, OF HEMPSTEAD, NEW YORK, ASSIGNORS, BY MESNE ASSIGNMENTS, TO SPERRY PRODUCTS, INC., OF BROOKLYN, NEW YORK, A CORPORATION OF NEW YORK

FLAW DETECTOR FOR IRREGULAR OBJECTS

Application filed August 17, 1929. Serial No. 386,538.

Our invention relates to electric means for detecting hidden or other flaws or irregularities or any internal abnormal conditions in metallic or other electrically conductive structures, the present invention relating more particularly to structures that are irregular in shape. By our invention means are provided by which a very complete investigation of the entire cross section of such objects may be carried forward. The invention extends to both making records and marking on the specimen under investigation the location of the internal fault.

Broadly our invention contemplates an arrangement of a plurality of such specimens which are identical in contour as to all dimensions, and the passing of a heavy current successively through the plurality of similar specimens. The specimens are preferably arranged in pairs and the circuit is so organized that the current passes through the specimens of each pair in opposite directions. In one form of our invention, which is particularly adapted to a type of irregular article having ends, we pass the current through one of said articles from end to end and then connect a similar article in the circuit, the current passing through the second article from end to end but in the reverse direction. At the same time we contemplate moving a pair of detector elements, preferably in the form of magnetic coils, with respect to said specimens, so that the coils pass the same portions of the respective specimens at the same time. If a flaw occurs in one or the other of said specimens, a current will be induced in the circuit through the coils in one direction or the other, depending upon which specimen contains the flaw. By this arrangement it will also be observed that any variations in the supply of current to the specimens will be automatically eliminated from the flaw detecting mechanism, since the current passes oppositely through the respective specimens and the effect of any variation will be opposite in the respective detecting coils and thus nullify each other.

In a second form of our invention, particularly adapted to elements without ends, such as endless wheels or rings, we may provide means for causing the current to enter at a given point on one of said specimens and taking the current out at another point on the said specimen removed from said first point, and then causing the current to enter the second specimen and leave the said second specimen at points corresponding to the points on the first specimen.

In another form of our invention, particularly adapted to that form of article without ends, such as a wheel or annular gear, we may cause the current to enter and leave the specimen at diametrically opposite points and position the detector coils at points equidistant from one or both of said electrodes. In this manner we achieve substantially the same result as when two specimens are employed, in that the current divides into two sections and one part of the specimen is matched against the other part so that the result is substantially the same as in the modification described hereinbefore wherein two entirely separate pieces are connected in series circuit.

In the case where the specimen or specimens to be tested are irregular in shape, it is quite apparent that equal sized flaws in portions of the specimen having different cross sections would yield lesser or greater indications of flaw, depending upon the varying current density, for obviously with a given current, varying current densities will be obtained at varying cross sections of the specimen. We may, therefore, provide any suitable means for regulating the supply of current to the specimens in accordance with the cross section thereof, increasing or decreasing the supply as the cross section increases or decreases and this variation may be achieved either by an operator controlling a rheostat by hand or automatically by means hereinafter described.

Further objects and advantages of this invention will become apparent in the following detailed description thereof.

In the accompanying drawing,

Fig. 1 is a front elevation, partly diagrammatic, illustrating the principle of our invention in one embodiment thereof.

Fig. 2 is a view, entirely diagrammatic, illustrating the path of the current through the Fig. 1 device.

Fig. 3 is a perspective, partly diagrammatic, illustrating an application of our invention to another form of irregular object.

Fig. 4 is a side elevation of the Fig. 3 device.

Fig. 5 is a front elevation of still another application of our invention to irregular objects, and disclosing a means for automatically varying the current density.

Fig. 6 is still another application of our invention to a type of irregular object.

Fig. 7 is a section taken substantially centrally through Fig. 6.

Fig. 8 is a portion of a record illustrating the effects of current density in the indication of flaws.

Referring to Figs. 1 and 2 of the drawing, there is illustrated the fundamental feature of our invention which is to oppose two similar specimens or parts, one to the other, under exactly similar conditions and to pass current through said specimens successively in opposite directions so that any variation occurring in either of them will immediately become apparent. For this purpose we have shown diagrammatically a generator G which is adapted to pass a current of high amperage into a specimen A at point 10 and leave the same at point 11. The current then enters specimen B at point 12 and leaves the same at point 13 to return to the generator. It will be understood that the specimens A and B are exactly similar to each other and that irregularities on said specimens are in exactly similar positions. It will be further observed that the current passes through specimen A and the same current passes through specimen B but in the reverse direction. If now detector coils C—C' be similarly positioned adjacent the respective members A and B and the said coils connected in any suitable manner, such as illustrated in the prior application of H. C. Drake, Serial No. 364,513, filed May 20, 1929, any variation in either specimen A or specimen B will at once induce a differential E. M. F. and cause current to flow in the circuit through coils C—C' which will be suitably amplified by the amplifying system M as disclosed in the said prior copending application.

It will further be seen that by this arrangement fluctuations in the supply of current will not induce any current in the circuit of coils C—C' bcause the effect of a variation of current supply in specimen A will be equal and opposite to the effect of such variation in specimen B.

In operation the coils C—C' are preferably fixedly joined as a unit and the specimens A and B are positioned substantially parallel to each other, so that corresponding irregularities on said specimens are in alignment, and the pair of detector coils C—C' is moved over the pair of specimens A—B from end to end. A flaw in specimen A will give an indication opposite in direction to that due to a flaw in specimen B.

The form of specimen disclosed in Fig. 1 is one having ends so that current may enter at one end and exit at the other and then be sent through the other specimen end to end in the opposite direction. This, however, is impossible with a form of specimen such as disclosed in Figs. 3 and 4, said specimen being a wheel with spokes. The same principle may be employed by causing the current to enter at a point 10' on the periphery of one of said members and exit at a point 11' spaced a given distance therefrom so that the major portion of the current is concentrated between points 10' and 11' and thence the current may be led to point 12' on the other specimen and exit at point 13'. The operation is exactly the same as before, a set of coils C—C' being carried by a member which fixedly joins the same and moved over the space between the points 10' and 11' and 13' and 12'. The specimens are then moved relative to the electrodes and either the specimens or the electrodes or both may be moved. After given portions of the wheels are searched we may turn both specimens through an annular distance to bring a new portion thereof into the searching zone; or if the wheels are fixed in position we may merely apply the brushes to the adjoining portion.

In the Fig. 5 form of the invention we have shown how the principle thereof may be applied to still another irregularly shaped specimen. In this case the specimen shown is a bearing of irregular cross section from end to end. The principle, however, is the same and similar specimens are mounted in substantially similar positions so that corresponding irregularities are opposed to each other and a pair of coils C—C' may be carried by a member 20 and moved from end to end of the specimens. In this instance, as in the other cases, current may enter the specimen A" at point 10" and exit at point 11" and then enter specimen B" at point 12" and exit at point 13".

In the form of the invention disclosed in Fig. 6, we have shown how the principle of this invention may be applied to an object that does not have ends, such as a ring or annular gear blank having various irregularities thereon, without employing two specimens. Thus, we may cause the current to enter the specimen D by electrode E and cause the current to be taken out by electrode E' diametrically opposite. It will be understood that the current entering at E divides equally in the two directions and we utilize this fact to oppose the two parts of the ring against each other. For this purpose we can provide a pair of detector coils C—C', said coils being positioned at equal angular distances from electrode E, or from electrode E'. Preferably said coils are 90° removed from the line joining said electrodes, which would place the coils equidistant from both electrodes. If now the specimen D is rotated about its axis through one half revolution, it will be seen that all points of said specimen will have been searched and any flaw will become apparent as it approaches one of the coils because a similar flaw will not be present adjacent the opposite coil. Here too, then, the same principle is involved of opposing one part against a similar part so that irregularities occur in exactly similar positions and the current passing through one part may be opposed to the current through the other part so that any flaws in one part or the other will become immediately apparent.

It will be appreciated from what has been hereinbefore described that with a given current passing through a specimen, the current density will vary as the cross section of the specimen varies. This may be found to have an undesirable effect as shown in the record of Fig. 8. Thus, if flaws of exactly the same size occur at two points P—P' in a given specimen, the said points having different cross sections, the left-hand record shows that a larger indication of flaw will be obtained at one of these points than at the other in spite of the fact that the flaws are of the same size due entirely to the different current densities which are due to the different cross sections. We contemplate, therefore, varying the current density in accordance with the cross section so that a constant current density will be obtained. When this is the case, then flaws of equal size, even though occurring at points of unequal cross section, will yield indications of the same size as shown in the right hand graph of Fig. 8.

For varying the current density in accordance with the varying cross section we may resort to the simple expedient of having the operator throw in or out resistance of a rheostat R by operating an arm R' thereover in accordance with the known variations of cross section of the specimens to be tested. Or we may provide for automatic variation of the current density as the cross section of the specimens varies. For this purpose we may provide a template or cam T whose contour T' is of a predetermined shape which has been calculated and laid out in accordance with the cross sections of the specimens to be tested. We cause the said cam T to be operated in a given manner so that the cam surface T' operates a bell crank L whose other arm is the arm R' operating over the rheostat R to cut out or in the necessary resistance to vary the current and keep the current density constant. We preferably mount the cam T integrally with the bar 20 to move with the same so that as the coils C—C' are moved from one end of the specimens to the other, the cam T will be correspondingly moved to operate the rheostat R. The movement of cam T may be guided in accordance with any predetermined path and in the instance shown may be guided for parallel horizontal movement by means such as the pantograph N.

In accordance with the provisions of the patent statutes, we have herein described the principle and operation of our invention, together with the apparatus which we now consider to represent the best embodiment thereof, but we desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described our invention, what we claim and desire to secure by Letters Patent is:

1. The method of electrical inspection of the interior of irregularly shaped specimens which consists in similarly energizing the specimens by preferably heavy electric current and simultaneously exploring like portions of each specimen by correlated inspection apparatus.

2. The method of electrical inspection of the interior of irregularly shaped specimens which consists in similarly energizing the specimens by preferably heavy electric current passed through the specimens in series and simultaneously exploring like portions of each specimen by correlated inspection apparatus.

3. The method of electrical inspection of the interior of irregularly shaped specimens which consists in similarly energizing the specimens by preferably heavy electric current passed oppositely through the specimens in series and simultaneously exploring like portions of each specimen by correlated inspection apparatus.

4. The method of electrical inspection of the interior of irregularly shaped specimens which consists in similarly energizing the specimens by preferably heavy electric current passed oppositely through the specimens in series and simultaneously exploring like portions of each specimen by correlated inspection apparatus, the said specimens lying parallel and adjacent to each other.

5. The method of electrical inspection of the interior of irregularly shaped specimens which consists in similarly energizing the specimens by preferably heavy electric current, simultaneously exploring like portions of each specimen by correlated inspection apparatus, and varying the intensity of the energizing current.

6. The method of electrical inspection of the interior of irregularly shaped specimens which consists in similarly energizing the specimens by preferably heavy electric current, simultaneously exploring like portions of each specimen by correlated inspection apparatus, and varying the intensity of the energizing current proportionately to the cross sections of the specimens.

7. The method of electrical inspection of the interior of irregularly shaped specimens which consists in similarly energizing the specimens by preferably heavy electric current, simultaneously exploring like portions of each specimen by correlated inspection apparatus, and automatically varying the intensity of the energizing current proportionately to the cross sections of the specimens.

8. The method of electrical inspection of the interior of irregularly shaped specimens which consists in similarly energizing the specimens by preferably heavy electric current and simultaneously exploring like portions of each specimen by electrically correlated inspection apparatus.

9. In a device for detecting flaws in irregularly shaped parts, means for passing an equal and opposite electric current through said parts, a searching device comprising a plurality of units cooperating with the respective parts and differentially connected, and means whereby said parts and units may be moved relatively.

In testimony whereof we have affixed our signatures.

ELMER A. SPERRY.
HARCOURT C. DRAKE.